Jan. 11, 1966     I. B. WEISE     3,228,655
VALVES
Filed Feb. 21, 1963
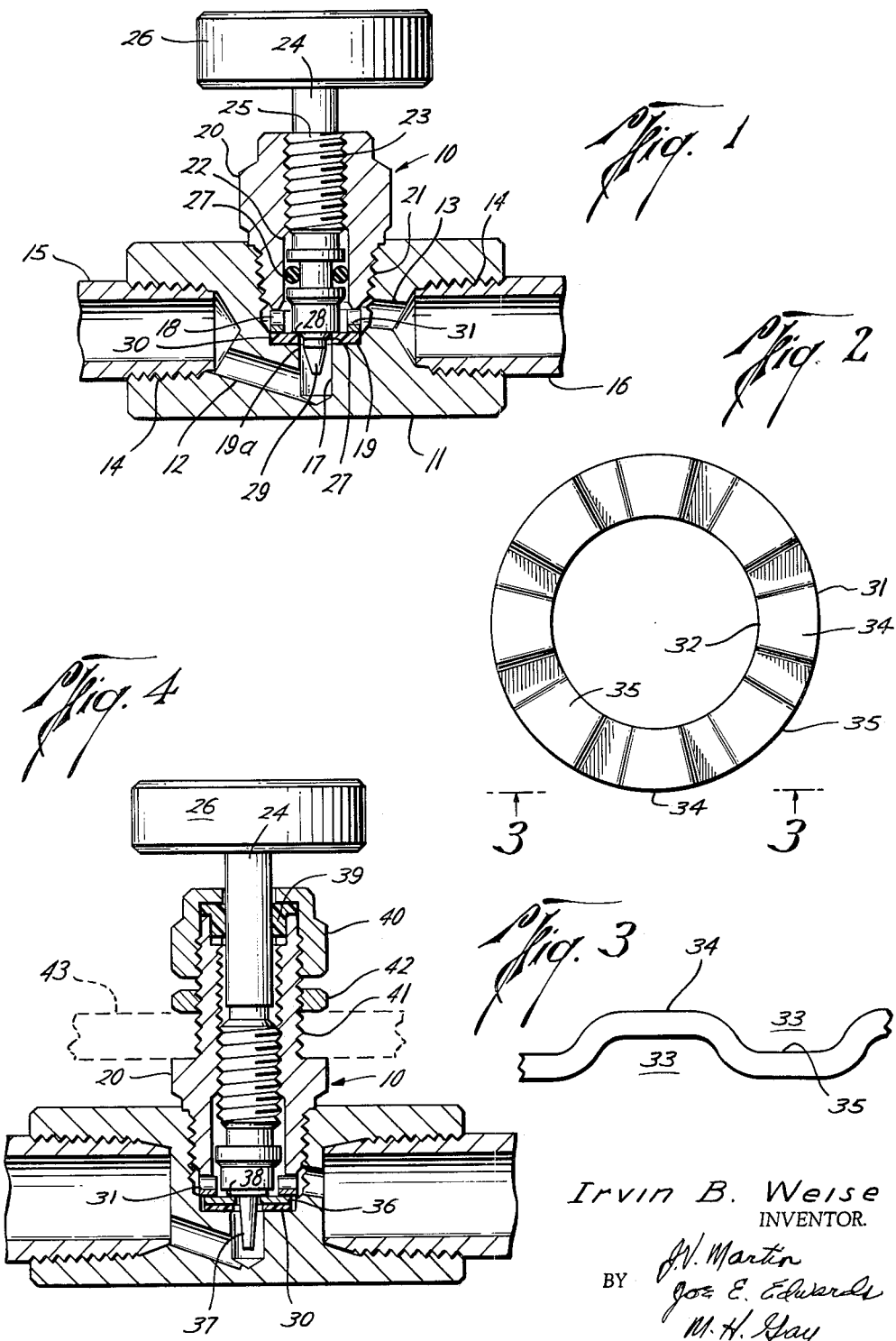
Irvin B. Weise
INVENTOR.
BY J. V. Martin
Joe E. Edwards
M. H. Gay
ATTORNEYS

United States Patent Office 3,228,655
Patented Jan. 11, 1966

3,228,655
VALVES
Irvin B. Weise, Bellaire, Tex., assignor to Anderson, Greenwood & Co., Houston, Tex., a corporation of Texas
Filed Feb. 21, 1963, Ser. No. 260,267
2 Claims. (Cl. 251—362)

This invention relates to new and useful improvements in valves, and more particularly it relates to a valve having a new and improved seating assembly.

It is a primary object of this invention to provide a simple and inexpensive valve having a seating assembly which may be changed for various uses and services as desired without necessitating any change to the other valve parts.

It is another object of this invention to provide a simple and inexpensive valve which may be converted from a metal seat to a soft seat valve without changing or modifying the form or structure of the other valve parts.

It is also an object of this invention to provide a valve of the character described having a seating assembly which includes a serpentine or corrugated flow washer disposed between the bonnet and body members of the valve for retaining a seating washer in place in the valve.

Another object of this invention is to provide a valve of the character described wherein the serpentine flow washer provides flow passages whereby flow through the valve is permitted.

Still another object of this invention is to provide a flow valve of the character described wherein the serpentine flow washer has sufficient resiliency to compensate for variable distances between the body and bonnet member of the valve whereby the necessity for close manufacturing tolerances between the dimensions of said body and bonnet is eliminated.

Yet another object of this invention is to provide a simple and inexpensive valve having a seating assembly whereby the valve may be readily converted to an accurate metering valve without changing or modifying the body or bonnet members of the valve.

The construction designed to carry out the invention will be hereinafter described, together with other features thereof.

The present invention will be readily understood from a reading of the following detailed description and reference to the drawings wherein:

FIGURE 1 is a cross-sectional elevational view illustrating a valve constructed in accordance with the present invention, FIGURE 2 is a plan view of the serpentine washer utilized in the present invention.

FIGURE 3 is an elevational view taken along line 3—3 of FIGURE 2, and

FIGURE 4 is a cross-sectional elevational view showing another embodiment of the invention.

In the drawings, the numeral 10 designates a valve constructed in accordance with the present invention. The valve 10 includes a body 11 having passages 12 and 13 therein at opposite ends of the body. Preferably the passage 12 is the inlet passage and the passage 13 is the outlet passage, but obviously, the flow may be reversed as desired. Each of the passages 12 and 13 are provided with suitable connecting means such as threads 14 whereby suitable tubular conduits 15 and 16 may be connected thereto.

The body 11 has a bore 17 extending partially therethrough and communicating with the inlet and outlet passages 12 and 13. A counterbore 18 of less depth than the bore 17 forms a seating shoulder 19 with the bore 17. A bonnet 20 is disposed in the counterbore 18 in sealing engagement therewith as by threads 21. The end of the bonnet 20 within the counterbore 18 is spaced from the seating shoulder 19 so that close dimensional tolerances between the length of the bonnet 20 and the depth of the counterbore 18 need not be maintained.

The bonnet 20 has a bore 22 extending therethrough, a portion 23 of the bore 22 being threaded. A stem 24 is disposed within the bore 22 in the bonnet 20 and has threads 25 thereon which engage and coact with the threaded portion 23 in the bonnet 20 whereby the stem 24 moves vertically as viewed in FIGURE 1 with respect to the bonnet 20 when the stem 24 is rotated as by a suitable handle 26 disposed at the upper end thereof. An O-ring type seal 27 is provided about the stem 24 below the threads 25 and is in sealing engagement with the wall of the bore 22 whereby the fluid flowing through the valve 10 does not contact the threads 23, 25.

The end of the stem 24 which extends into the counterbore 18 is provided with a downwardly converging tapered portion 27 which is of a lesser diameter than the stem 24 whereby a shoulder 28 is formed. As the stem 24 is turned and moves downwardly, the tapered portion 27 on the stem 24 comes into sealing engagement with the corner 19a formed at the intersection of the bore 17 and the shoulder 19 so that flow is shut off through the valve body 11. A depending tapered portion 29 is provided on the end of the stem 24 below the tapered seating surface 27 so that throttling is accomplished between the fully opened and fully closed positions of the stem 24. When the stem is in the open position, the fluid flows through the inlet 12, bore 17, counterbore 18 and is discharged through the outlet passage 13. The structure heretofore described may be used in the manner of any well known valve having a metal valve seat, but by reason of the valve seat structure and bonnet arrangement, the valve is adaptable for modification to make it applicable for different and varied uses.

The modification or change in the seating surface which would adapt the valve for a different use or service can be made without having to change or modify any of the valve parts. Such modification may involve the substitution of another seating surface, as for example when the corner 19a becomes pitted and worn, or it may involve the substitution of a "soft" seat in lieu of the metal-to-metal or "hard" seat.

The valve 10 may be readily converted by simply placing a seating assembly therein, the assembly including an annular seating member 30 disposed in the counterbore 18 in contact with the shoulder 19. The seating member 30 may be of any desired material, such as metal if a hard seat is desired or Teflon if a soft seat is desired, and has a flow orifice therethrough which is properly sized so that the tapered surface 27 on the stem 24 may move into sealing engagement with the edge thereof, or so that the shoulder 28 on the stem 24 may move into sealing engagement with the top surface of the seating member 30, whereby flow through the orifice and valve may be shut off.

The seating assembly also includes a serpentine or corrugated flow washer 31 disposed between the end of the bonnet 20 and the seating member 30 to retain the seating member 30 in place against the shoulder 19 and to provide flow paths whereby the fluid may flow out of the counterbore 18 and into the outlet passage 13. As best seen in FIGURES 2 and 3, the serpentine washer 31 is provided with a central flow opening 32 and radial flow passages 33 formed by the alternating ridges 34 and valleys 35. The alternating ridge-and-valley or serpentine construction provides a semi-circumferentially extending flat surface at each ridge and valley to provide sufficient surfaces for engagement with the seating member 30 and end of the bonnet 20 so that the seating member 30 is firmly retained in place. It is also noted that the serpentine construction may permit the retaining member or washer 31 to have a sufficient amount of resiliency to compensate for varying distances between the seating member 30 and the end of the bonnet 20 whereby the necessity for close manufacturing tolerances between the depth of the counterbore 18 and the bonnet 20 is eliminated. Of course, the retaining member or flow washer 31 could obviously be designed with little or no resiliency in which event it nonetheless functions as a retaining member which provides the desired flow passages.

When the valve 10 is opened by raising the stem 24, the fluid flows through the inlet 12, bore 17, annular seating member 30 into counterbore 18, and thence radially outwardly through radial flow passages 33 in the serpentine flow washer 31 into the outlet 13. However, as has been noted, the flow through the valve may be reversed if desired so that the passage 12 is the outlet and the passage 13 is the inlet.

As illustrated in FIGURE 4, the valve 10 may be converted to a very accurate metering valve without modifying or changing the body or bonnet members. The conversion is accomplished by the addition of an annular metering orifice 36 preferably disposed between the serpentine washer 31 and the seating member 30. Also, a relatively long tapering needle extends from the bottom of the stem 24 through the opening in the metering orifice 36 so that the flow in the annulus formed by the edge of the opening and the needle 37 may be varied and controlled very accurately. The diameter of the largest section of the tapered needle 37 may be less than the diameter of the opening through the metering orifice 36 so that these parts are not damaged by contact therebetween. In this event, a shoulder 38 is provided on the end of the stem 24 which is pressed into tight sealing engagement with the top of the metering orifice 36 as the stem is turned and moved downwardly so that flow through the valve is shut off.

FIGURE 4 also illustrates several other modifications in the valve illustrated in FIGURE 1. For instance, a packing 39 is provided as the sealing means between the stem 24 and the bonnet 20 in lieu of the O-ring 27 illustrated in FIGURE 1. In the FIGURE 4 embodiment, a packing nut 40 engages external threads 41 on the bonnet 20 to hold the packing 39 in sealing engagement between the stem 24 and bonnet 20. Of course, an O-ring could be substituted for the packing 39 at the upper end of the bonnet 20. A mounting nut 42 may also be provided in engagement with external threads 41 whereby the valve 10 may be readily mounted on a panel 43 as illustrated by the dotted lines in FIGURE 4.

The foregoing disclosure and description of the invention is illustrative and explanatory thereof, and various changes in the size, shape and materials, as well as in the details of the illustrated construction, may be made within the scope of the appended claims without departing from the spirit of the invention. By way of illustration, and not limitation, the serpentine flow washer might be made in a plurality of semi-circular segments instead of one piece; the serpentine flow washer and the seating member or metering orifice may be formed or molded in one piece; a handle having a vernier scale thereon may be substituted for the illustrated handle 26 when accurate and repeatable metering is desired; and the valve may be changed to the so-called "angle" type by disposing the inlet 12 in vertical alignment with the bore 17 and at right angles to the outlet 13.

What is claimed is:
1. A valve comprising,
a body having an inlet passage and an outlet passage,
said body having a bore therein communicating with said inlet and outlet passages,
a shoulder formed by said bore and a counterbore,
said shoulder being disposed between said inlet and said outlet passages,
a bonnet disposed in said bore in sealing engagement with the wall of said bore,
the end of said bonnet being spaced from said shoulder,
an annular seating member disposed between said shoulder and said end of said bonnet in engagement with said shoulder,
an annular resilient retaining washer confined between the said seating member and said end of said bonnet whereby said seating member is retained in place,
said annular resilient retaining washer having sufficient resiliency to compensate for varying distances between said end of said bonnet and said seating member,
said annular resilient retaining washer being formed to provide flow passages therethrough, the external diameter of said annular resilient retaining washer being slightly less than the diameter of said counterbore so that said counterbore maintains said retaining washer substantially concentric therewith,
said bonnet having a bore therethrough,
and a stem disposed in said bore through said bonnet in sealing engagement therewith and movable relative thereto,
said stem having a seating surface formed on one end thereof,
said seating surface adapted for movement into sealing engagement with said seating member whereby flow through said valve is prevented.

2. A valve comprising,
a body having an inlet passage and an outlet passage,
said body having a bore therein communicating with said inlet and outlet passages,
a shoulder formed by said bore and a counterbore,
said shoulder being disposed between said inlet and said outlet passages,
a bonnet disposed in said bore in sealing engagement with the wall of said bore,
the end of said bonnet being spaced from said shoulder,
an annular seating member disposed between said shoulder and said end of said bonnet in engagement with said shoulder,
an annular resilient retaining washed confined between the said seating member and said end of said bonnet whereby said seating member is retained in place,
said annular resilient retaining washer having sufficient resiliency to compensate for varying distances between said end of said bonnet and said seating member,
said annular resilient retaining washer being formed to provide flow passages therethrough,
an annular centering shoulder formed in said counterbore,
said centering shoulder having a downwardly, inwardly tapering surface which coacts with the peripheral surface of the resilient washer to center said resilient washer with respect to said counterbore,
said bonnet having a bore therethrough,
and a stem disposed in said bore through said bonnet in sealing engagement therewith and movable relative thereto,
said stem having a seating surface formed on one end thereof,
said seating surface adapted for movement into sealing engagement with said seating member whereby flow through said valve is prevented.

References Cited by the Examiner

UNITED STATES PATENTS

| | | | |
|---|---|---|---|
| 1,097,069 | 5/1914 | Wright | 277—142 |
| 1,295,099 | 2/1919 | Ayotte | 313—324 |
| 2,917,271 | 12/1959 | Banks | 251—362 |
| 3,148,700 | 9/1964 | Friedell | 251—362 X |

FOREIGN PATENTS 24,189    12/1912    Great Britain.

M. CARY NELSON, *Primary Examiner.*

J. FENNELL, L. KAMPSCHROR, S. SCOTT,
*Examiners.*